(12) United States Patent
Buttolph (10) Patent No.: US 9,984,841 B1
(45) Date of Patent: May 29, 2018

(54) WIRE RELEASE MECHANISM

(71) Applicant: Simmonds Precision Products, Inc., Vergennes, VT (US)

(72) Inventor: Martin Edwy Buttolph, Leicester, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 16 days.

(21) Appl. No.: 15/360,733

(22) Filed: Nov. 23, 2016

(51) Int. Cl.
H01H 37/50 (2006.01)

(52) U.S. Cl.
CPC .................................. H01H 37/50 (2013.01)

(58) Field of Classification Search
CPC ...... H01H 37/323; H01H 37/52; H01H 37/56; H01H 61/02; H01H 61/0107; F03G 7/065
USPC .............. 60/527–529; 74/2; 337/1, 140, 401
See application file for complete search history.

(56) References Cited

U.S. PATENT DOCUMENTS

| | | | | | |
|---|---|---|---|---|---|
| 3,924,688 | A | * | 12/1975 | Cooper | A62C 37/40 169/11 |
| 4,030,061 | A | * | 6/1977 | Gaskell | A62C 3/16 200/61.08 |
| 4,246,561 | A | * | 1/1981 | McVey | H01H 37/765 337/407 |
| 5,471,888 | A | * | 12/1995 | McCormick | A62C 37/10 137/76 |
| 5,606,889 | A | * | 3/1997 | Bielinski | G05G 17/00 137/76 |
| 6,140,905 | A | * | 10/2000 | Shoji | H01H 37/761 337/401 |
| 8,581,686 | B2 | * | 11/2013 | Galla | H01H 37/761 29/623 |
| 8,904,781 | B2 | | 12/2014 | Buttolph | |
| 2011/0006875 | A1 | * | 1/2011 | Striebig | H01H 79/00 337/401 |
| 2013/0300532 | A1 | | 11/2013 | Striebig et al. | |
| 2014/0013738 | A1 | * | 1/2014 | Buttolph | F03G 7/065 60/527 |
| 2017/0138354 | A1 | * | 5/2017 | Buttolph | F03G 7/065 |

FOREIGN PATENT DOCUMENTS

DE        102011012158 B9    11/2012

* cited by examiner

*Primary Examiner* — Dion R Ferguson
*Assistant Examiner* — Amir Jalali
(74) *Attorney, Agent, or Firm* — Kinney & Lange, P.A.

(57) ABSTRACT

A wire release mechanism includes two components with adjacent longitudinal fingers and a wire that is wound about the fingers. The wire restrains one of the components in one position and includes a higher resistance fuse that causes the wire to be loosened about the fingers to allow that component to move to another position due to the flow of electrical current through the fuse.

20 Claims, 6 Drawing Sheets

WIRE RELEASE MECHANISM

BACKGROUND

The present invention relates generally to release mechanism, and, more particularly, to an electrically powered wire release mechanism.

Certain applications call for a simple, compact actuation system for providing a force and/or for moving a pin, plunger, or other device. While such a task can be completed with the use of explosives or other pyrotechnics or a relatively large electrical input, these systems can involve substantial expense, additional safety measures, and/or increased size, weight and/or complexity. In addition, traditional split-spooled wire-restrained devices may provide for actuation of a component in a manner which uses neither pyrotechnics nor an inordinate amount of electrical input. However, such devices can occupy a substantial amount of space and present other limitations as well.

SUMMARY

According to one embodiment, a wire release mechanism includes two components with adjacent longitudinal fingers and a wire that is wound about the fingers. The wire restrains one of the components in one position and includes a higher resistance fuse that causes the wire to be loosened about the fingers to allow that component to move to another position due to the flow of electrical current through the fuse.

According to another embodiment, a method of using a wire release mechanism includes positioning two components with longitudinal fingers adjacent to one another. A wire includes a fuse and is wound about the fingers to restrain one of the components in one position to form the wire release mechanism. The method also includes screwing the wire release mechanism into a housing, electrically connecting the wire with the housing.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

The present summary is provided only by way of example, and not limitation. Other aspects of the present disclosure will be appreciated in view of the entirety of the present disclosure, including the entire text, claims and accompanying figures.

DETAILED DESCRIPTION

Figure 1A:
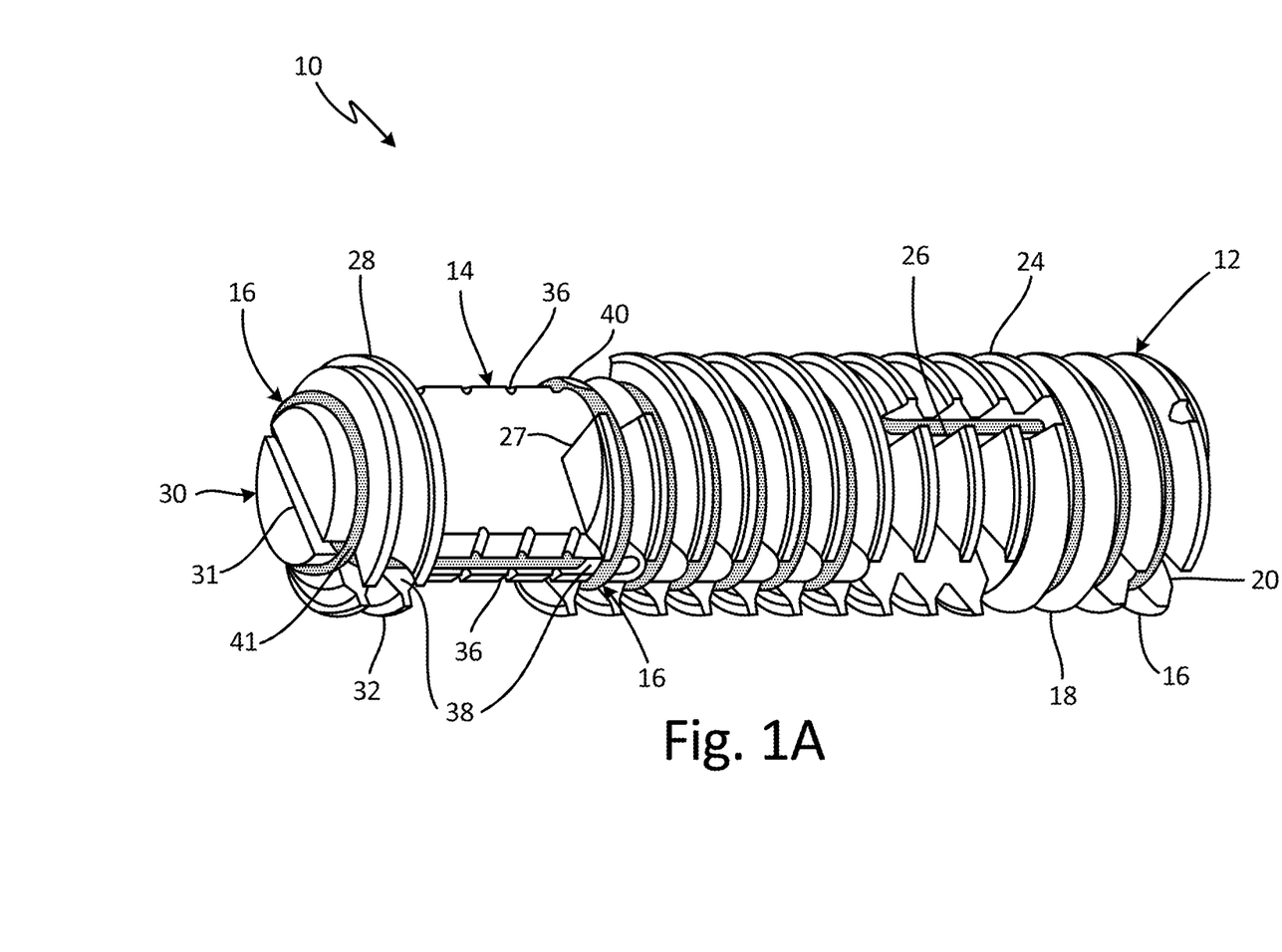
FIG. 1A is a generally front perspective view of an embodiment of a wire release mechanism.
Figure 1B:
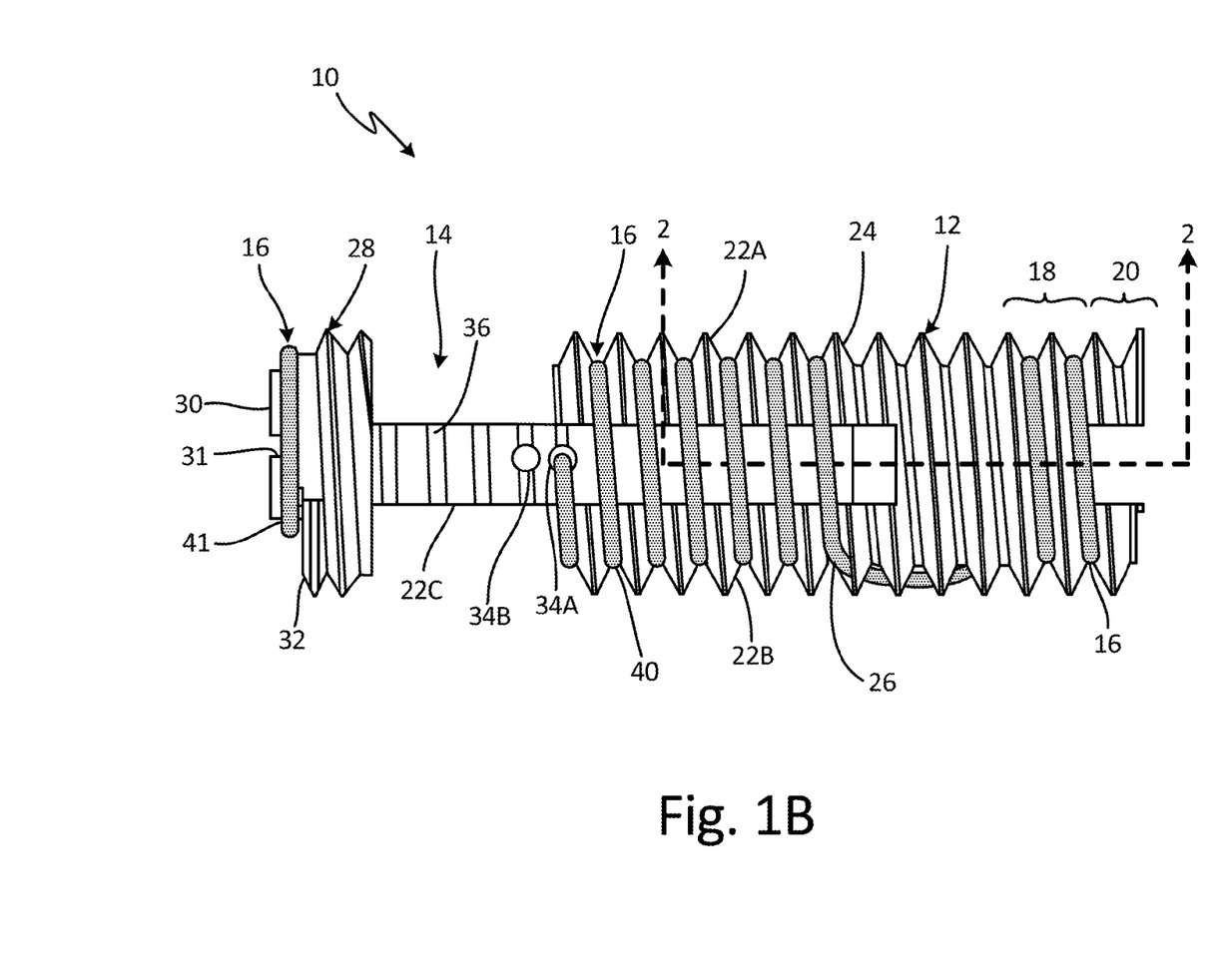
FIG. 1B is a rear side view of the wire release mechanism shown in FIG. 1A.
Figure 2A:
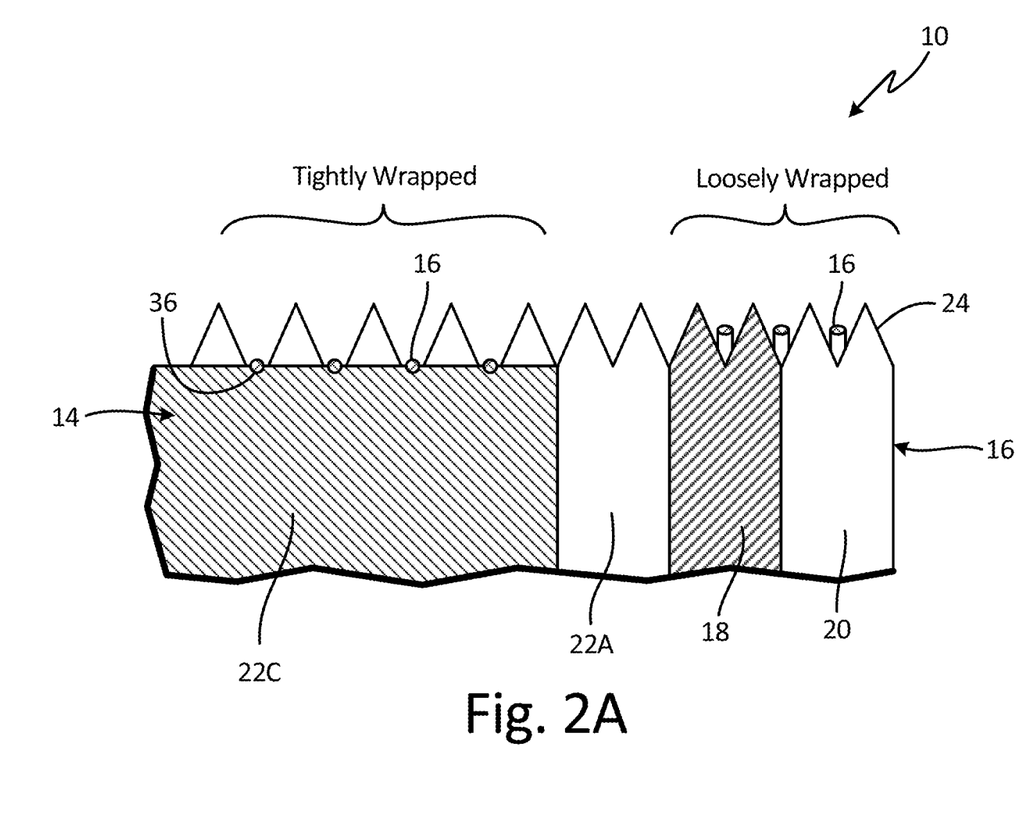
FIG. 2A is a partial cross-sectional view of the wire release mechanism as denoted by line 2-2 in FIG. 1B.
Figure 2B:
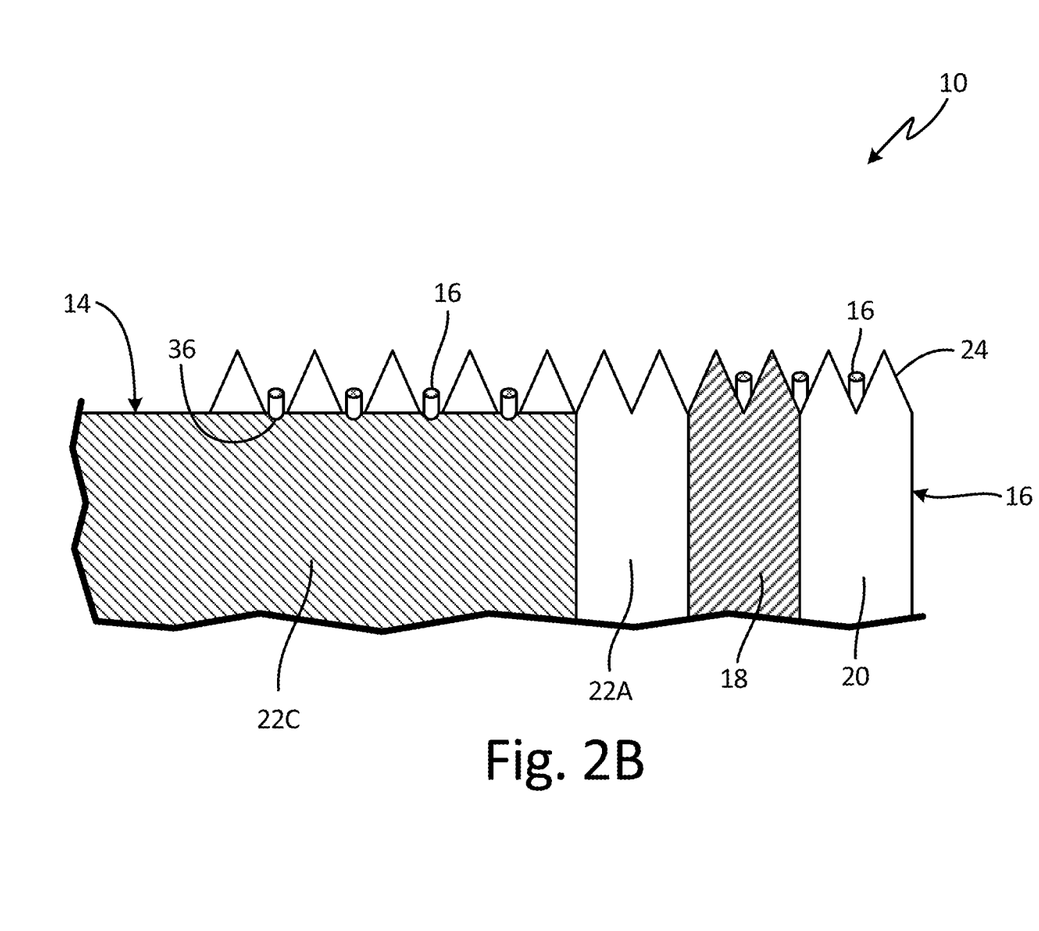
FIG. 2B is a partial cross-sectional view of the wire release mechanism shown in FIG. 2A after a wire has been untensioned.

FIG. 1A is a generally front perspective view of wire release mechanism 10. FIG. 1B is a rear side view of mechanism 10 shown in FIG. 1A. FIG. 2A is a partial cross-sectional view of wire release mechanism 10 as denoted by line 2-2 in FIG. 1B. FIG. 2B is a partial cross-sectional view of wire release mechanism 10 shown in FIG. 2A after wire 16 has been untensioned. FIGS. 1A-2B will now be discussed in conjunction with one another, and the designations of "front" and "rear" are utilized merely for relative reference.

In the illustrated embodiment, mechanism 10 has a generally cylindrical shape and comprises body 12, plunger 14, and wire 16. Body 12 has base 18 with slotted portion 20 in the side that is distal from plunger 14. Extending toward plunger 14 from base 18 are fingers 22A and 22B. Fingers 22A and 22B are parallel and spaced apart from each other. On the exterior of body 12 is body thread 24 that forms a groove that accommodates wire 16 and is configured to be an attachment means for wire release mechanism 10. For example, body thread 24 is a standard thread size, shape, and pitch so that body 12 can be screwed into a tapped port using slotted portion 20 to mount and/or secure mechanism 10. In addition, body thread 24 is interrupted by longitudinally extending trough 26, which is also configured to accommodate wire 16. Body thread 24 is also interrupted by notch 27, which is a spacing feature of body 12 that is configured to not be in contact with wire 16. Thereby, that the corresponding portion of wire 16 is surrounded by the atmospheric environment (which is most likely air) at this particular location.

Plunger 14 comprises cap 28 with boss 30 extending from the side that is distal from body 12. Boss 30 includes slot 31 which extends across boss 30. On the exterior of cap 28 is cap thread 32 which is timed with body thread 24 and is the same or is similar to the size, shape, and pitch of body thread 24. Extending toward body 12 from cap 28 is finger 22C. Finger 22C, cap 28, and boss 30 are all configured to accommodate wire 16. More specifically, plunger 14 includes ports 34A and 34B and interrupted groove 36 in finger 22C. The pitch and diameter of interrupted groove 36 is substantially similar to that of body thread 24. Plunger 14 also includes trench 38 which begins in finger 22C and passes through cap 28 to slot 30. In addition, ports 34A and 34B extend to trench 38.

In the illustrated embodiment, wire 16 has a generally circular cross-section, except at fuse 40. Fuse 40 is an integral portion of wire 16 that has a smaller cross-sectional area than the nominal cross-sectional area of at least the adjacent sections of wire 16. This causes fuse 40 to have a higher electrical resistance than the nominal electrical resistance of at least the adjacent sections of wire 16. More specifically, fuse 40 can have a semi-circular cross-section, such that a portion of the exterior of fuse 40 is circular and another portion is flat. In an alternate embodiments, fuse 40 can have two opposed flat sides to be ostensibly rectangular in cross-section, or fuse 40 can have four flat sides to be literally rectangular or square in cross-section. In other alternate embodiments, fuse 40 can be an integral portion of wire 16 that has a different material composition than the nominal composition of at least the adjacent sections of wire 16 such that fuse 40 has a higher electrical resistance per unit length than the nominal electrical resistance per unit length of at least the adjacent sections of wire 16.

According to one method, in order to assemble mechanism 10, plunger 14 is positioned adjacent to body 12 such that finger 22C is positioned alongside of and between fingers 22A and 22B. Wire 16 is passed through one of ports 34A and 34B so that fuse 40 is positioned outside of finger 22C. The choice of ports 34A and 34B depends on the desired overall length of mechanism 10, and the selected port is lined up with body thread 24 to time interrupted groove 36 with body thread 24. Then wire 16 is wrapped tightly around fingers 22A-22C in body thread 24 and interrupted groove 36 so that fuse 40 is positioned proximate notch 27 such that fuse 40 is spaced apart from fingers 22A and 22C. In this tightly-wrapped portion of mechanism 10, wire 16 prevents plunger 14 from moving relative to body 12 (as shown in FIG. 2A). The process of tightly wrapping a portion of wire 16 can involve some plastic deformation of wire 16, although a significant amount of elastic deformation also occurs. The elastic deformation results in a stress (i.e., potential energy) in wire 16 that would cause wire 16 to expand (therefore being closer to its original shape) if a section of wire 16 were broken.

Wire 16 is then bent around the portion of body thread 24 that is positioned at the end of trough 26 that is proximate to plunger 14. Thereby, this portion of body thread 24 along with the selected port 34A or 34B secures wire 16 in tension by preventing circumferential movement of wire 16. Wire 16 is abruptly bent out of body thread 24 and into trough 26 which extends to base 18. This plastically formed abrupt bend anchors the end of the tightly-wrapped portion of wire 16 proximate body 16, which is in opposition to the end of the tightly-wrapped portion of wire 16 proximate plunger 14 (which is anchored port 34A or 34B). Wire 16 is then more loosely wrapped around base 18 and slotted portion 20 (as shown in FIG. 2A) to provide a contact surface to a device housing (shown with reference numeral "42" in FIG. 3) for an electrical connection from the housing to wire 16.

On the oppose side of the selected port 34A and 34B from fuse 40, wire 16 is bent to lay into trench 38. While interrupted groove 36 and trench 38 longitudinally overlap each other, wire 16 is only positioned in one of them at a given longitudinal location. That is because of the different purposes that interrupted groove 36 and trench 38 serve. Interrupted groove 36 is used to selectively secure plunger 14 to body 12, whereas trench 38 provides a place for wire 16 to reside as it extends to boss 30 that is out of the way of the other components of mechanism 10. Wire 16 is then passed through slot 31 and wrapped around boss 30 to form loop 41. Loop 41 provides another contact surface for an electrical connection to wire 16 that is at the opposite end of mechanism 10 from base 18.

In order to release plunger 14 from body 12, a relatively small electrical current is flowed through wire 16. The electrical current encounter greater resistance through fuse 40 due to the smaller cross-sectional area of fuse 40, which causes resistive heating in fuse 40. Because fuse 40 is substantially thermally isolated from body 12 and plunger 14 (by being spaced therefrom in notch 27), heat builds up in fuse 40. This structurally weakens fuse 40, and because fuse 40 is located in the tightly wrapped portion of wire 16, the result is that fuse 40 significantly stretches or breaks completely. This allows wire 16 to radially expand and move outward out of interrupted groove 36, as shown in FIG. 2B. Thus, plunger 14 is free to move at least axially with respect to body 12. Alternatively, wire 16 may relax enough that, owing to the sloped sides of the interrupted groove 36, plunger 14 can force wire 16 out of interrupted groove 36 as plunger 14 moves axially.

The electrical current runs from the electrical connection of wire 16 proximate base 18 to the electrical connection of wire 16 proximate boss 30 (and/or in the opposite direction). In order for mechanism to selectively release plunger 14, the electrical current needs to flow through fuse 40. Therefore, in one embodiment, plunger 14 is made of an electrically insulating material, and body 12 can be made of an insulating or conducting material. Alternatively, both body 12 and plunger 14 can be made of conducting material an electrically insulating barrier (not shown) is placed over plunger 14 to prevent the electricity from flowing directly through body 12 and plunger 14 or to prevent the electricity from flowing through a part of wire 16 that is upstream of fuse 40 to plunger 14 (via interrupted groove 36), bypassing fuse 40. In addition, a portion of body 12 can be insulated at the end that is proximate to fuse 40 to ensure that the electrical path flows through multiple coils of wire 16.

The components and configuration of wire release mechanism 10 allow for plunger to be selectively held and released using a relatively small amount of electrical energy, for example, 2 J of energy due to a 7 A current over a 7V potential for a duration of 0.040 seconds. In addition, mechanism 10 has a very compact size. Shown in FIGS. 1A-2B is one embodiment of the present invention, to which there are alternative embodiments. For example, fuse 40 can have a different shape that still has a smaller cross-sectional area than the conducting portions of wire 16. For another example, cap 28 is plain such that there is no cap thread 32. For yet another example, there can be more or less ports 34 than two. For yet another example, mechanism 10 can have a different means of attaching body 12 other than body thread 24, and similarly, mechanism 10 can have a different means of attaching plunger 14 other than cap thread 32. In such embodiments, body 12 and/or plunger 14 can include lugs, latches, adhesives, and/or an interference fit outer diameter.

Figure 3:
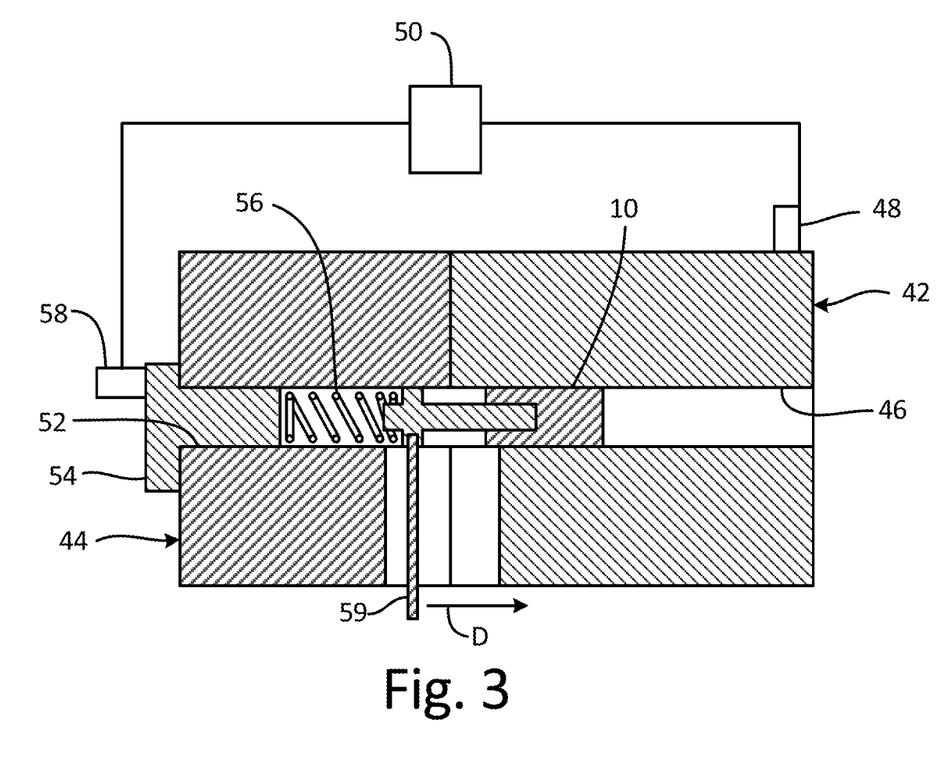
FIG. 3 is a schematic cross-sectional view of the wire release mechanism shown in FIG. 1B installed in a housing and a device.

FIG. 3 is a schematic cross-sectional view of wire release mechanism 10 installed in housing 42 and device 44. In the illustrated embodiment, housing 42 includes housing hole 46 which is threaded (not shown) to engage with body thread 24 (shown in FIG. 1A). Housing 42 is made of an electrically conductive material and includes housing contact 48 that provides an electrical connection from electrical system 50 to wire 16 (shown in FIG. 1A).

Device 44 includes device hole 52 which is threaded (not shown) to engage with cap thread 32 (shown in FIG. 1A). Because body thread 24 and cap thread 32 (shown in FIG. 1A) are timed together, mechanism 10 can be installed by being screwed into housing 42 and device 44, or mechanism 10 can be installed by screwing mechanism 10 though either one of housing 42 or device 44 to reach the other one of housing 42 or device 44.

In the illustrated embodiment, bolt 54 is also fastened into device hole 52, and positioned between bolt 54 and mechanism 10 is spring 56. Bolt 54 and spring 56 are made of electrically conductive materials and bolt 54 includes device contact 58. Device contact 58 provides an electrical connection from electrical system 50 to wire 16 (shown in FIG. 1A). Specifically, spring 56 is compressed by bolt 54 against wire 16, specifically at loop 41 (shown in FIG. 1A).

In order to ensure that the electrical current flows through mechanism 10, device 44 is made of an electrically insulating material. In alternative embodiments, device 44 is made of an electrically conductive material and there is an electrically insulating barrier (not shown) between housing 42 and device 44. Housing 42 can also be made of an electrically insulating material, although in such an embodiment, housing contact 48 would be more directly connected to wire 16.

After mechanism 10 is actuated by electrical current at a prescribed time, device 44 can move relative to housing 42. The movement of device 44 can release another component (not shown), for example, by moving out of the way of said component. That component can then be allowed to make a greater motion to, for example, release a door. Alternatively or additionally, mechanism 10 can include transfer member 59 which is connected to plunger 14. After mechanism 10 is actuated by electrical current at the prescribed time, transfer member 59 moves in direction D. The displacement of transfer member 59 can allow the aforementioned component and/or another component to make a greater motion to, for example, release a door.

Figure 4:
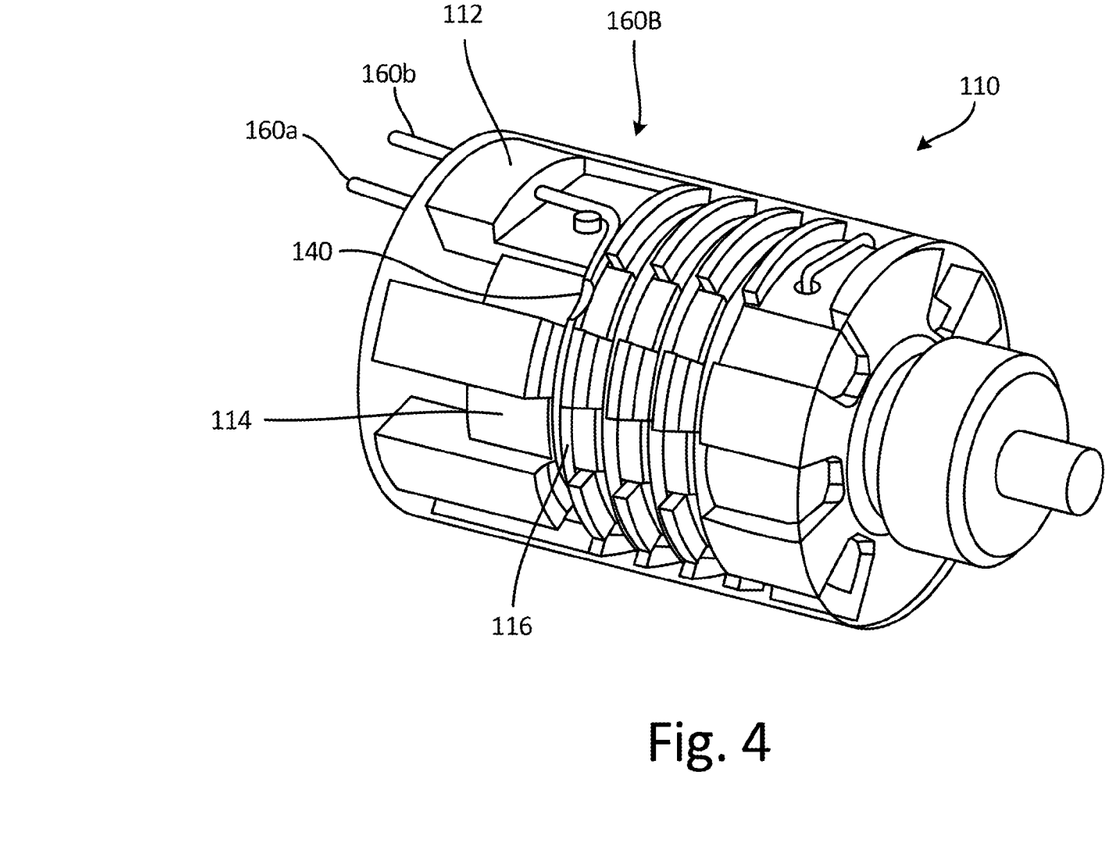
FIG. 4 is a perspective view of an alternate embodiment wire release mechanism.

FIG. 4 is a perspective view of an alternate embodiment wire release mechanism 110. Mechanism 110 is similar to the wire release mechanism described in U.S. Pat. No. 8,904,781. However, mechanism 110 has a single wire 116 with a circular cross-section that extends from electrical terminal 160A to 160B, which are both mounted on body 112. Wire 116 includes fuse 140, which is configured and functions similarly to or the same as fuse 40 that has been described with respect to FIGS. 1A-2B. In addition, portions of wire 116 are routed through body 112 so that electrical terminals 160A and 160B can be positioned external to the rest of mechanism 110.

In order to release plunger 114 from body 112, a relatively small amount of electrical energy, for example, 2 J of energy due to a 7 A current over a 7V potential for a duration of 0.040 seconds, is flowed through wire 116 at a prescribed time. The electrical current encounters greater resistance through fuse 140 due to the smaller cross-sectional area of fuse 140, which causes fuse 140 to heat up. This heat structurally weakens fuse 140, and the result is that fuse 140 significantly stretches or breaks completely. This allows wire 116 to expand and allows plunger 114 to move at least axially with respect to body 112.

Discussion of Possible Embodiments

The following are non-exclusive descriptions of possible embodiments of the present invention.

A wire release mechanism according to an exemplary embodiment of this disclosure, among other possible things includes: a first component with a first base and a first finger longitudinally extending from the base; a second component with a second base and a second finger longitudinally extending from the base, the second component being positioned adjacent to the first component such that the first finger is longitudinally alongside the second finger, and wherein relative longitudinal movement is permitted between the first finger and the second finger such that the second component is movable longitudinally relative to the first component between a first position and a second position; and a wire that begins at the first base, is wound about the first and second fingers, and ends at the second base; wherein the wire restrains the second component in the first position and including a higher resistance fuse portion that selectively causes the wire to be loosened about the first and second fingers to allow the second component to move to the second position due to the flow of electrical current through the fuse portion of the wire.

The wire release mechanism of the preceding paragraph can optionally include, additionally and/or alternatively, any one or more of the following features, configurations and/or additional components:

A further embodiment of the foregoing wire release mechanism, wherein the first component can further comprise: a third finger that longitudinally extends from the body and is spaced apart from the first finger, the third finger being positioned longitudinally alongside the second finger such that the second finger is positioned between the first and third fingers; wherein the first, second, and third fingers together form a generally cylindrical surface portion; wherein the first and third fingers define a plurality of first groove segments; wherein the second finger defines a plurality of second groove segments that are timed with the first groove segments; and wherein the wire is wound about the cylindrical surface portion in the first and second groove segments.

A further embodiment of any of the foregoing wire release mechanisms, wherein a first exterior of the first component can include a first thread.

A further embodiment of any of the foregoing wire release mechanisms, wherein the first exterior includes a longitudinal trough that can extend transversely through the first thread such that there is a first portion of the first thread that is on a distal side of the trough from the second component and there is a second portion of the first thread that is on a proximate side of the trough to the second component.

A further embodiment of any of the foregoing wire release mechanisms, wherein the wire can extend through the trough, and the wire is wrapped loosely around the first portion of the first thread and tightly around the second portion of the first thread.

A further embodiment of any of the foregoing wire release mechanisms, wherein a second exterior of the second component can include a second thread that is timed with the first thread.

A further embodiment of any of the foregoing wire release mechanisms, wherein the wire can be wrapped in the first and second threads.

A further embodiment of any of the foregoing wire release mechanisms, wherein the first component can be electrically insulative.

A further embodiment of any of the foregoing wire release mechanisms, wherein the second component can be electrically insulative.

A further embodiment of any of the foregoing wire release mechanisms, wherein the fuse portion can be located adjacent at least one of the first and second fingers.

A further embodiment of any of the foregoing wire release mechanisms, wherein the wire can have a circular cross-sectional shape and the fuse portion can have a partially circular shape with a flat side.

A further embodiment of any of the foregoing wire release mechanisms, wherein the fuse portion can have a smaller cross-sectional area than a nominal cross-sectional area of adjacent sections of the wire to achieve a higher electrical resistance through the fuse portion.

A further embodiment of any of the foregoing wire release mechanisms, wherein the fuse portion can have a different material composition than a nominal material composition of adjacent sections of the wire to achieve a higher electrical resistance through the fuse portion.

A further embodiment of any of the foregoing wire release mechanisms, wherein at least one of the first and second components further includes a spacing feature proximate to the fuse in order to thermally isolate the fuse from the at least one of the first and second components.

A further embodiment of any of the foregoing wire release mechanisms, wherein the wire can extend around an end of the second component that is distal from the first component.

A further embodiment of any of the foregoing wire release mechanisms, wherein the second component can further comprise: a port through which the wire passes.

A method of using a wire release mechanism according to an exemplary embodiment of this disclosure, among other possible things includes: positioning a first component with a longitudinally extending first finger adjacent to a second component with a longitudinally extending second finger such that the first finger is longitudinally alongside the second finger and such that the first component can move longitudinally relative to the second component between a first position and an actuation position; winding a wire about the first and second fingers to restrain the second component in the first position, the wire including a fuse portion, to form the wire release mechanism; and screwing the wire release mechanism into a housing such that a first thread on an exterior of the first component engages a second thread on an interior of the housing and electrically connects the wire with the housing.

The wire release mechanism of the preceding paragraph can optionally include, additionally and/or alternatively, any one or more of the following features, configurations and/or additional components:

A further embodiment of the foregoing method, wherein the method can further comprise: weakening structurally the fuse portion of the wire, by flow of an electrical current through the wire, to loosen the wire about the first and second fingers such that the second component can move to the actuation position.

An actuation system according to an exemplary embodiment of this disclosure, among other possible things includes: a combination of a first component with a longitudinally extending first finger and a second component with a longitudinally extending second finger such that the first finger is longitudinally alongside the second finger, and wherein relative longitudinal movement is permitted between the first finger and the second finger such that the second component is movable longitudinally with respect to the first component between a first position and a second position; a wire wound about the first fingers and the second fingers that selectively restrains the second component in the first position, the wire including a fuse portion that selectively causes the wire to be loosened about the first and second fingers to allow the second component to move to the second position by way of flow of electrical current; and a third component connected to the second component that moves with the second component from the first position to the second position.

The actuation system of the preceding paragraph can optionally include, additionally and/or alternatively, any one or more of the following features, configurations and/or additional components:

A further embodiment of the foregoing actuation system, wherein the combination can define a cavity between the first body portion and the second body portion, adjacent the first and the second fingers, and the actuation system can further comprise: a biasing member positioned in the cavity that biases the second component towards the second position.

A further embodiment of any of the foregoing actuation systems, wherein a first exterior of the first component can include a first thread.

A further embodiment of any of the foregoing actuation systems, wherein the first exterior can include a longitudinal trough that extends transversely through the first thread such that there is a first portion of the first thread that is on a distal side of the trough from the second component and there is a second portion of the first thread that is on a proximate side of the trough to the second component.

A further embodiment of any of the foregoing actuation systems, wherein the wire can extend through the trough, and the wire can be wrapped loosely around the first portion of the first thread and tightly around the second portion of the first thread.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wire release mechanism, comprising:
   a first component with a first base and a first finger longitudinally extending from the base;
   a second component with a second base and a second finger longitudinally extending from the base, the second component being positioned adjacent to the first component such that the first finger is longitudinally alongside the second finger, and wherein relative longitudinal movement is permitted between the first finger and the second finger such that the second component is movable longitudinally relative to the first component between a first position and a second position; and
   a wire that begins at the first base, is wound about the first and second fingers, and ends at the second base;
   wherein the wire restrains the second component in the first position and includes a higher resistance fuse portion that selectively causes the wire to be loosened about the first and second fingers to allow the second component to move to the second position due to the flow of electrical current through the fuse portion of the wire.

2. The wire release mechanism of claim 1, wherein the first component further comprises:
   a third finger that longitudinally extends from the body and is spaced apart from the first finger, the third finger being positioned longitudinally alongside the second finger such that the second finger is positioned between the first and third fingers;

wherein the first, second, and third fingers together form a generally cylindrical surface portion;

wherein the first and third fingers define a plurality of first groove segments;

wherein the second finger defines a plurality of second groove segments that are timed with the first groove segments; and wherein the wire is wound about the cylindrical surface portion in the first and second groove segments.

3. The wire release mechanism of claim 1, wherein a first exterior of the first component includes a first thread.

4. The wire release mechanism of claim 3, wherein the first exterior includes a longitudinal trough that extends transversely through the first thread such that there is a first portion of the first thread that is on a distal side of the trough from the second component and there is a second portion of the first thread that is on a proximate side of the trough to the second component.

5. The wire release mechanism of claim 4, wherein the wire extends through the trough, and the wire is wrapped loosely around the first portion of the first thread and tightly around the second portion of the first thread.

6. The wire release mechanism of claim 1, wherein a second exterior of the second component includes a second thread that is timed with the first thread.

7. The wire release mechanism of claim 1, wherein the first component is electrically insulative.

8. The wire release mechanism of claim 1, wherein the second component is electrically insulative.

9. The wire release mechanism of claim 1, wherein the fuse portion is located adjacent at least one of the first and second fingers.

10. The wire release mechanism of claim 1, wherein the fuse portion has a smaller cross-sectional area than a nominal cross-sectional area of adjacent sections of the wire to achieve a higher electrical resistance through the fuse portion.

11. The wire release mechanism of claim 1, wherein the fuse portion has a different material composition than a nominal material composition of adjacent sections of the wire to achieve a higher electrical resistance through the fuse portion.

12. The wire release mechanism of claim 1, wherein at least one of the first and second components further includes a spacing feature proximate to the fuse in order to thermally isolate the fuse from the at least one of the first and second components.

13. The wire release mechanism of claim 1, wherein the wire extends around an end of the second component that is distal from the first component.

14. The wire release mechanism of claim 1, wherein the second component further comprises:
a port through which the wire passes.

15. A method of using a wire release mechanism, the method comprising:

positioning a first component with a longitudinally extending first finger adjacent to a second component with a longitudinally extending second finger such that the first finger is longitudinally alongside the second finger and such that the first component can move longitudinally relative to the second component between a first position and an actuation position;

winding a wire about the first and second fingers to restrain the second component in the first position, the wire including a fuse portion, to form the wire release mechanism; and screwing the wire release mechanism into a housing such that a first thread on an exterior of the first component engages a second thread on an interior of the housing and electrically connects the wire with the housing.

16. The method of claim 14, further comprising:
weakening structurally the fuse portion of the wire, by flow of an electrical current through the wire, to loosen the wire about the first and second fingers such that the second component can move to the actuation position.

17. An actuation system, comprising:

a combination of a first component with a longitudinally extending first finger and a second component with a longitudinally extending second finger such that the first finger is longitudinally alongside the second finger, and wherein relative longitudinal movement is permitted between the first finger and the second finger such that the second component is movable longitudinally with respect to the first component between a first position and a second position;

a wire wound about the first fingers and the second fingers that selectively restrains the second component in the first position, the wire including a fuse portion that selectively causes the wire to be loosened about the first and second fingers to allow the second component to move to the second position by way of flow of electrical current; and a third component connected to the second component that moves with the second component from the first position to the second position.

18. The actuation system of claim 17, wherein the combination defines a cavity between the first body portion and the second body portion, adjacent the first and the second fingers, the actuation system further comprising:
a biasing member positioned in the cavity that biases the second component towards the second position.

19. The actuation system of claim 17, wherein a first exterior of the first component includes a first thread, and wherein the first exterior includes a longitudinal trough that extends transversely through the first thread such that there is a first portion of the first thread that is on a distal side of the trough from the second component and there is a second portion of the first thread that is on a proximate side of the trough to the second component.

20. The actuation system of claim 19, wherein the wire extends through the trough, and the wire is wrapped loosely around the first portion of the first thread and tightly around the second portion of the first thread.

* * * * *